Feb. 16, 1954  J. E. GROSS  2,669,449
SHOCK ABSORBER
Filed March 27, 1951

INVENTOR.
Joseph E. Gross.
BY
Birney Hines
ATTORNEY.

Patented Feb. 16, 1954

2,669,449

UNITED STATES PATENT OFFICE 2,669,449

SHOCK ABSORBER

Joseph E. Gross, Swissvale, Pa.

Application March 27, 1951, Serial No. 217,860

5 Claims. (Cl. 267—70)

My invention relates to shock absorbers and, more particularly, to shock absorbers for use in conjunction with the operating power cables in power shovels and draglines.

One object of my invention is to provide for reducing the impact forces set up in the operation of power shovels and draglines.

Another object is to provide for greatly reducing, without much motion, the shocks and strains usually involved in the operation of the power cables in power shovels and other apparatus and machinery, and thereby increase the life and usefulness of such apparatus and machinery.

A further object is to provide a shock absorber for heavy operating cables which shall be simple to manufacture, install and maintain in operation.

A still further object is to provide a shock absorber for securing the dead ends of heavy power operating cables which will greatly reduce the wear and tear on such cables and greatly prolong their life and usefulness in operation.

For a better understanding of my invention, reference may be had to the accompanying drawing, in which.

Figure 1:
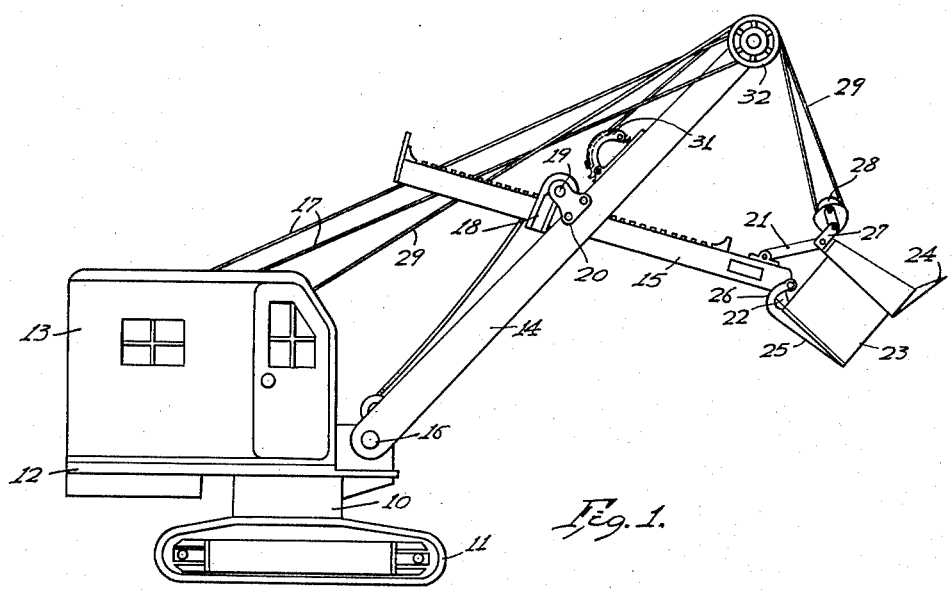
Figure 1 is a view, in side elevation, of a power shovel embodying my improvement in shock absorbers.

Referring more particularly to Fig. 1, I have illustrated a power shovel comprising a base 10 mounted on the usual Caterpillar tracks 11 for rotatably supporting a shovel platform 12 upon which is disposed a cab 13. A boom 14 is mounted on the front end of the platform 12 to provide a movable support for a shovel stick 15. The boom 14 is attached to the platform 12 by a plurality of hinge bolts 16 so that its outer end may be raised or lowered by a pair of hoist cables 17 which connect the outer end of the boom to a suitable power means (not shown) in the cab 13.

The stick 15 is movably supported in the central portion of the boom by a stick saddle 18 mounted on a shipper shaft 19, the outer ends of which are rotatably seated in suitable bearing brackets 20 attached to the side members of the boom.

Fixed on the outer end of the stick 15 by means of a pair of brackets 21 and 22 is a shovel or bucket 23 having a plurality of teeth 24 and a lid 25. The lid is attached to the bucket by a hinged connection 26 so that it may be opened to discharge the loads picked up by the bucket. A bracket 27 is attached to the upper part of the bucket and provided with a pulley 28 for a flexible power device such as a bucket-hoisting cable 29. One end of the cable 29 is attached to the upper portion of the boom by my improved shock absorber 31 from which it passes over a sheave 32 on the outer end of the boom, thence through the pulley 28 on the bucket, thence over another sheave (not shown) on the outer end of the boom, and from there to a power hoisting mechanism (not shown) in the cab 13.

Figures 2, 3, 4:
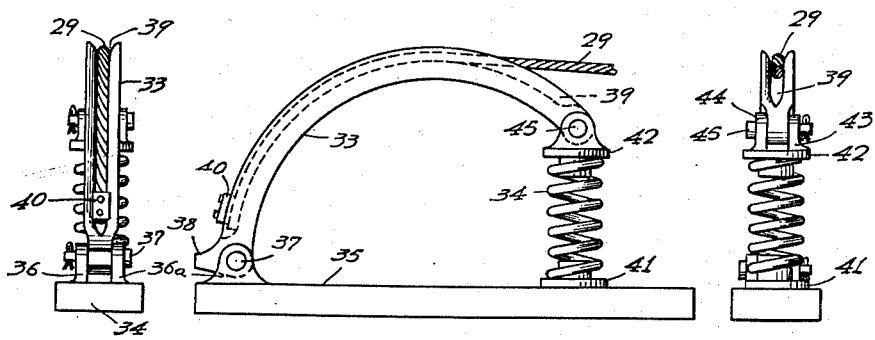
Fig. 2 is an enlarged view of my improved shock absorber illustrated in Fig. 1.
Fig. 3 is a view in rear end elevation of the shock absorber illustrated in Fig. 2.
Fig. 4 is a view in front elevation of the shock absorber illustrated in Fig. 2.

Referring more particularly to Figs. 2, 3 and 4, the shock absorber 31 is illustrated as comprising a curved arm 33, a resilient compressible body such as a helical spring 34, and a supporting base member 35. The arm is disposed on the base with its convex side toward the base with its one end between a pair of projections 36 and 36a on the upper rear face of the base member and is hingedly secured in that position by a hinge bolt 37. A limiting lug 38 is cast or otherwise secured to the rear bottom portion of the arm to limit movement of the arm in an upward and back direction. The curved arm is provided with a cable-receiving track or groove 39 in its outer curved face. The dead-end portion of the bucket-hoisting cable is seated in the groove and attached to the rear end of the arm by a fastening means such as a cable securing bracket 40.

In constructing the arm, it may be either cast or rolled and then machined to provide a smooth well-shaped groove or track for receiving the bucket-hoisting cable. Preferably, the curve of the curved portion of the arm 33 should be similar to that of the segment of the sheave 32 over which the bucket-hoisting cable passes after it leaves the shock absorber and should have the same radius as that sheave so that the cable in its movement will be operating on curved surfaces of the same radius in both the shock absorber and the sheave. Also, the radius of the arm and the sheave should be in proper proportion to the size of the cable.

The spring element 34 of the shock absorber is mounted with its lower end disposed on a spring seat 41 fixed on the base 35 and with its upper end engaged and maintained in position by a spring seat 42 which is hingedly attached to the movable end of the arm 33 by a pair of lugs 43 and 44 and a hinge bolt 45.

In operating the power shovel, any load on the bucket-hoisting cable will tend to pull the curved arm downwardly against the compression spring 34. Assuming that the load increases, as it increases it increases the downward movement of the free end of the curved arm thus permitting the cable to move more nearly toward a straight line position between the hinged end of the arm and the point at which the cable engages its sheave on the end of the boom. As the outer end of the curved arm moves downwardly and the cable moves more nearly to a straight line, the leverage point of contact of the cable with the curved portion of the arm shifts toward the hinged end of the arm. As the point of leverage shifts in accordance with any increase or decrease in the load on the cable, it permits the spring to readily absorb any sudden increase in load without much compressive movement and thus easily prevents any sudden load from injuriously affecting the cable or the apparatus on which it is used. Thus, it will be seen that my improved shock absorber will greatly reduce the shocks and strains usually involved in the operation of power cables in power shovels and other apparatus and machinery.

Although I have illustrated and described only one specific embodiment of my invention, I realize that it is susceptible of wide application, and I do not desire to be limited to the precise construction illustrated and described.

I claim as my invention:

1. In a shock absorber for a power cable, a base member, a curved arm having a cable track on its convex surface, a hinge means hingedly connecting one end of the arm to the base member with its concave face toward the base member, a cable fastening device mounted on the arm at a point adjacent to the hinged end of the arm, and a coiled spring disposed between the free end of the arm and the base member for resiliently opposing movement of the free end of the arm toward the base member when a load is applied to the cable.

2. In a shock absorber for a flexible power means, a base member, an arm having a convex surface with a track thereon for the flexible power means, a hinge means connecting one end of the arm to the base member with its convex surface away from the base member, a power means fastening device mounted on the arm at a point adjacent to its hinged end, and a resilient means disposed between the free end of the arm and the base member for opposing movement of the free end of the arm toward the base member when a load is applied to the flexible power means.

3. In a shock absorber for a cable, a base member, a resilient member disposed on one end portion of the base member, an arm having its one end disposed on the resilient member and its other end hingedly connected to the other end portion of the base member, said arm having a convex outer face provided with a track for the cable, and a fastening means for securing the dead-end of the cable to the track portion of the arm at a point adjacent to its hinged end.

4. A shock absorber comprising a base member, an arm having a curved surface provided with a track, a hinge connecting one end of the arm to the base member, a cable fastening means mounted on the track portion of the arm at a point near its hinged end, and a resilient device disposed between the movable end of the arm and the base member for resiliently opposing movement of the arm toward the base member when a load is applied to the cable.

5. A shock absorber comprising a base member, an arm having a curved track portion, a hinge connecting one end of the track portion of the arm to the base member, a fastening means mounted on the track portion of the arm near its hinged end for securing a flexible power device thereto, and a resilient device connected to the arm and the base member for opposing movement of the track portion of the arm toward the base member when a load is applied to the power device.

JOSEPH E. GROSS.

References Cited in the file of this patent

UNITED STATES PATENTS

| Number | Name | Date |
|---|---|---|
| 296,965 | Huber et al. | Apr. 15, 1884 |
| 708,658 | Osgood | Sept. 9, 1902 |
| 2,385,906 | Zeilman | Oct. 2, 1945 |
| 2,558,381 | Pointer | June 26, 1951 |

FOREIGN PATENTS

| Number | Country | Date |
|---|---|---|
| 383,881 | Great Britain | Nov. 24, 1932 |